United States Patent [19]

Rost et al.

[11] 4,222,368

[45] Sep. 16, 1980

[54] SOLAR ENERGY COLLECTION APPARATUS AND SYSTEM

[75] Inventors: Duane F. Rost, Canfield; Gene J. Ameduri, Poland, both of Ohio

[73] Assignee: General Extrusions, Inc., Youngstown, Ohio

[21] Appl. No.: 863,264

[22] Filed: Dec. 22, 1977

[51] Int. Cl.$^3$ ................................................ F24J 3/02
[52] U.S. Cl. ............................... 126/438; 126/446; 126/450
[58] Field of Search .............. 126/270, 271, 438, 439, 126/443, 449, 451, 450

[56] References Cited

U.S. PATENT DOCUMENTS

| | | | |
|---|---|---|---|
| 2,274,492 | 2/1942 | Modine | 126/271 |
| 3,310,102 | 3/1967 | Trombe | 165/133 |
| 3,923,039 | 12/1975 | Falbel | 126/271 |
| 3,982,527 | 9/1976 | Cheng et al. | 126/270 |
| 4,024,852 | 5/1977 | L'Esperance et al. | 126/271 |
| 4,064,867 | 12/1977 | Schlesinger | 126/400 X |

Primary Examiner—James C. Yeung
Assistant Examiner—Larry Jones
Attorney, Agent, or Firm—Oldham, Oldham, Hudak & Weber Co.

[57] ABSTRACT

A solar energy collection apparatus has a reflector for reflecting the rays of sunlight incident thereupon to, and concentrating them upon, an absorber. Mounting blocks insulate and position the reflector and absorber with respect to each other and to support struts. Due to a wide angle of acceptance of the apparatus, the rays of the sun are collected for a substantial part of a day as well as for a period of time of many days or months. Additionally, the reflector-absorber assembly can be readily adjusted for other periods of time throughout the year by changing the length of the support struts.

16 Claims, 8 Drawing Figures

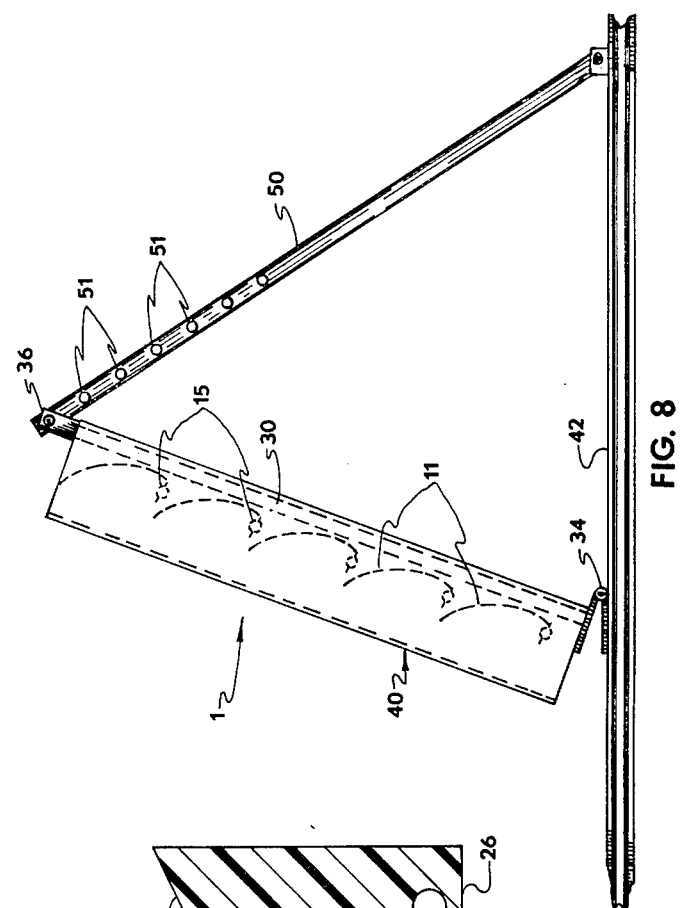
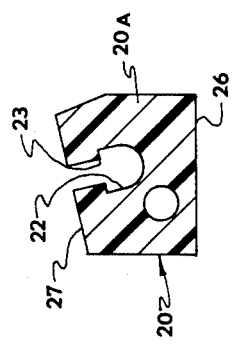
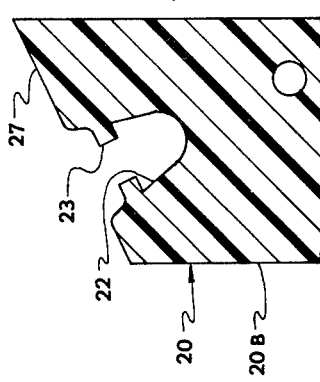
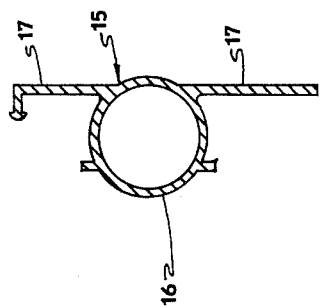
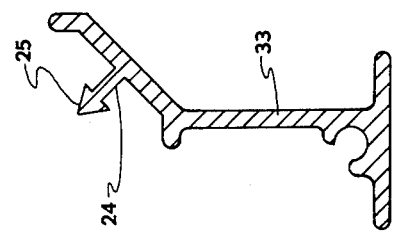

SOLAR ENERGY COLLECTION APPARATUS AND SYSTEM

BACKGROUND OF THE INVENTION

The present invention relates to a solar energy collector for collecting heat from the rays of the sun. More specifically, the present invention relates to a solar energy collector apparatus mounted on insulating blocks having a wide sun-ray acceptance angle.

Heretofore, numerous solar collectors have been constructed to obtain and utilize the heat from sunlight. However, many of these solar collectors have been automatic in that they "track" the sun and therefore involve complicated and intricate structure as well as assembly and, thus, are very costly. Moreover, due to the greater number of parts and sensitivity thereof, they were susceptible to mistracking or breakdown.

Still other systems relate to the utilization of the rays of the sun over a matter of hours during a day, but are inefficient in collecting and transferring the energy from sunlight. For example, U.S. Pat. No. 3,923,039 to Falbel is inefficient since it has a low concentration ratio of the reflector to the absorber plate and the larger absorber plate permits high thermal loss from both sides. Similarly, U.S. Pat. No. 3,982,527 to Cheng et al relates to various reflector-absorber integral units as shown on the cover, as well as to various embodiments thereof as shown in FIGS. 13 through 19. Such a design permits heat loss to occur through the larger absorber fins. In U.S. Pat. No. 3,991,740 to Rabl, there is shown another integral reflector-absorber solar energy collector, which is very similar to that of Falbel, but which deliberately incorporates a seasonably variable concentration. Thus, this design will not maximize the collected solar energy.

Some solar energy collectors have utilized insulation in one form or another. In U.S. Pat. No. 3,951,128 to Schoenfelder, the pipe carrying the heated fluid is insulated. Of course, this principle of insulation is very old in that various heating pipes have been insulated for centuries. In U.S. Pat. No. 3,994,279 to Barak, the backside of the absorber is insulated to limit radiation loss from said backside. Also, in U.S. Pat. No. 4,003,366 to Lightfoot, the backside of a reflector is insulated to abate the conduction or radiation of heat towards the side and bottom walls of the housing supporting the reflector. However, the absorber of Lightfoot is not insulated and heat loss occurs from both sides.

However, none of these prior art patents suggests applicant's solar energy collector wherein the absorber is separated from the reflector, and yet closely attached thereto. Additionally, the prior art patents further fail to teach the use of a mounting block to insulate the absorber from the reflector, and yet attach and align the two with respect to one another. Applicant's solar energy collector further relates to a device which needs only to be adjusted a few times during the year, and yet effectively and efficiently gathers heat from the rays of the sun throughout a substantial portion of a day for a period of numerous days to even months.

SUMMARY OF THE INVENTION

Accordingly, it is an object of the present invention to provide a solar energy collector which is efficient, has an optimum concentration ratio, and yet is inexpensive to produce.

It is another object of the present invention to provide a solar energy collector, as above, which efficiently collects solar energy throughout a substantial portion of daylight and for numerous days before any adjustment is required to compensate for the change in inclination of the sun.

It is a further object of the present invention to provide a solar energy collector, as above, wherein an absorber is closely attached to a reflector, and yet is insulated therefrom.

It is an additional object of the present invention to provide a solar energy collector, as above, wherein a plurality of absorbers and reflectors exists, and wherein a particular absorber is located beneath an adjacent reflector.

It is a yet further object of the present invention to provide a solar energy collector, as above, wherein a mounted block secures an absorber to, and yet insulates it from, an adjacent reflector.

It is a yet further object of the present invention to provide a solar energy collector, as above, wherein said mounting blocks are secured to a strut.

It is a yet additional object of the present invention to provide a solar energy collector, as above, wherein a plurality of said reflectors and absorbers are mounted on a strut.

It is still another object of the present invention to provide a solar energy collector, as above, wherein solar energy is collected for at least several hours a day efficiently, for numerous days without changing the angle of the reflector or the absorber with respect to the sun.

These and other objects of the present invention will become apparent from the following specification which describes in detail the embodiments without attempting to discuss all of the modifications in which the invention might be embodied.

Generally, a solar energy collector for reflecting and concentrating radiant energy, comprises: a reflector, said reflector having a curvilinear reflecting surface; an absorber for collecting concentrated radiant energy, said absorber having a conduit; and said absorber spaced apart from said reflector.

BRIEF DESCRIPTION OF THE DRAWINGS

FIG. 4 is an enlarged cross-sectional view of an absorber;

FIG. 5 is an enlarged end view of a mounting block support;

FIG. 6 is an enlarged cross-sectional view of a mounting block;

FIG. 7 is an enlarged cross-sectional view of another mounting block; and

FIG. 8 is an end view showing a solar energy collector panel mounting in operating position.

PREFERRED EMBODIMENTS OF THE INVENTION

Figure 1:
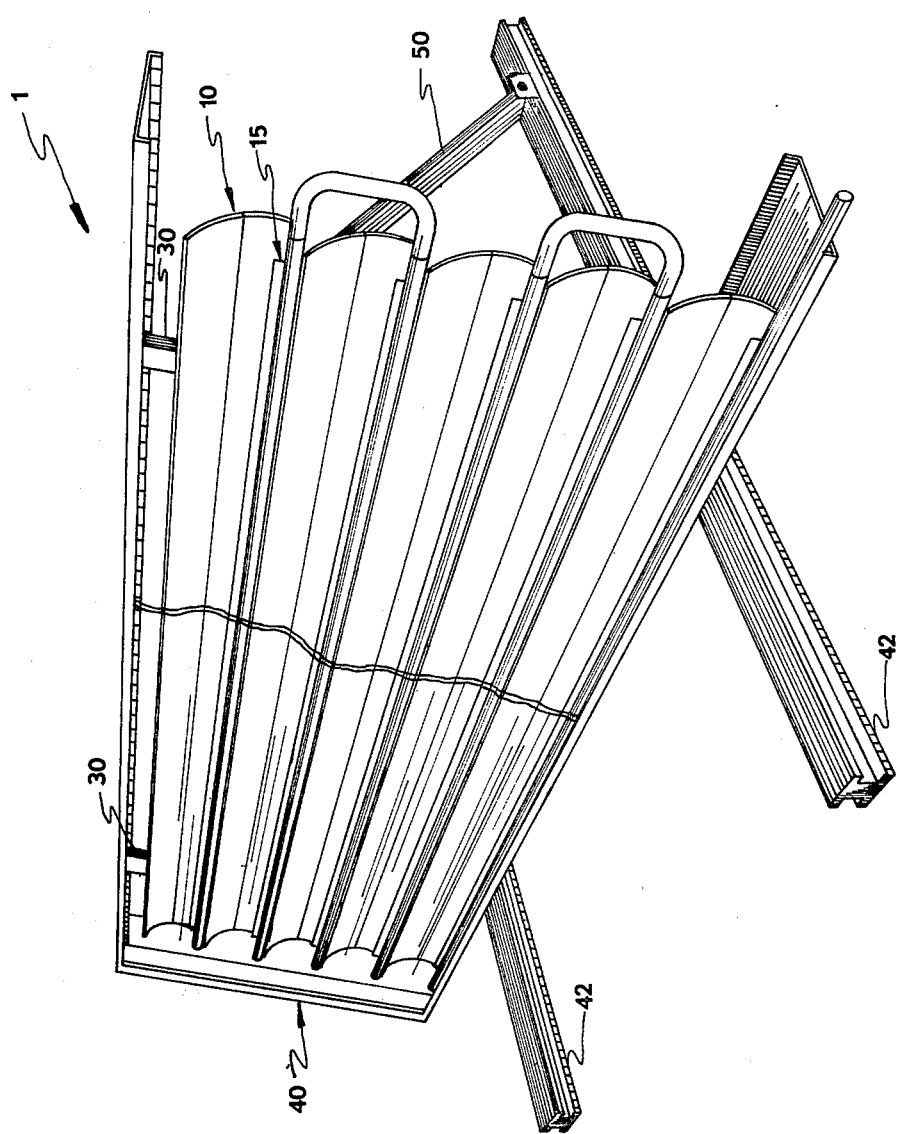
FIG. 1 is a perspective view of a plurality of solar energy collectors assembled in a panel.
Figure 2:
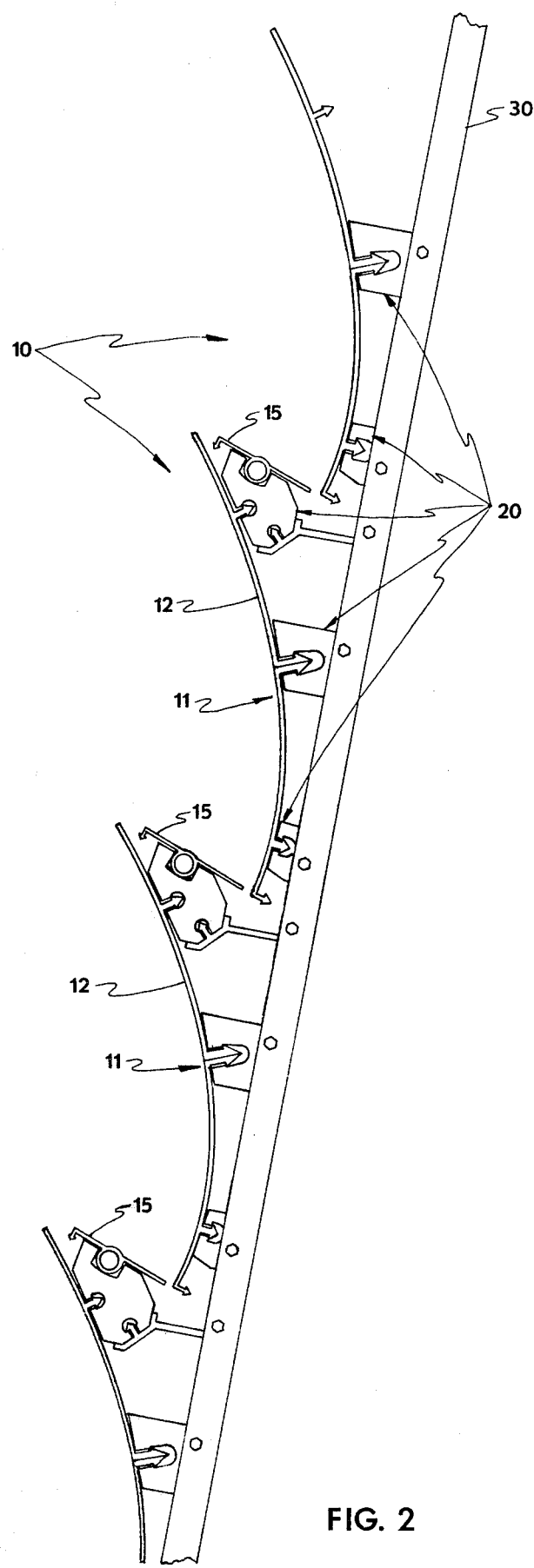
FIG. 2 is a cross-sectional view of a plurality of solar energy collectors.

A solar energy collector panel, generally indicated by the numeral 1, basically comprises a plurality of reflectors 11 and absorbers 15, as shown in FIG. 2. An individual solar energy collector, generally indicated by the numeral 10, collects solar energy by receiving sunlight on reflector 11 and reflecting it to, and concentrating it on, absorber 15. Reflector 11 is curvilinear and preferably in the shape of a half parabola. Generally, any material having a high reflective surface can be utilized such as various metals, substrates having a mirror or a mirror-like finish such as Mylar coated fiberglass, and the like, with aluminum being preferred due to its high strength to weight ratio as well as ease of shaping such as through any conventional extruding operation. To maximize the reflection of solar radiant energy, when reflector 11 is a metal, it is usually polished to a mirror finish. Alternatively, to ensure protection from corrosion, reflector surface 12 can be plated with any protective and highly reflective compound or metal such as nickel, chrome, and the like.

Figure 3:
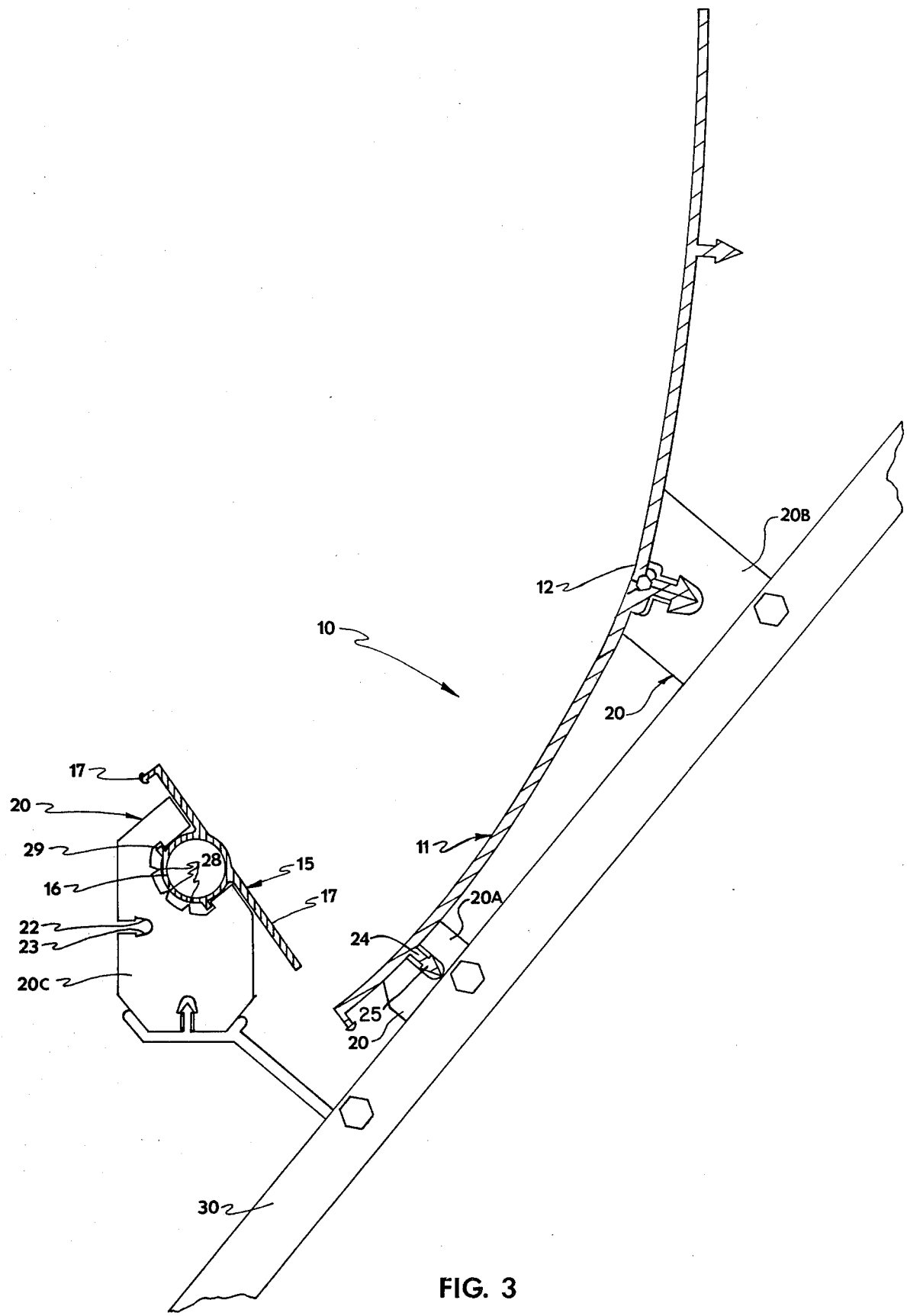
FIG. 3 is an enlarged cross-sectional view of a reflector and an absorber mounted on a support strut.

Absorber 15, as with reflector 11, can be made from any suitable high heat conductive material or metal, with aluminum being preferred. Generally, any conventional aluminum may be utilized, desirably one which has a high corrosion resistance as well as a high thermal conductivity constant. The absorber may be extruded according to any conventional manner, and desirably has a wide angle of radiant energy acceptance and transfers a high amount of heat to absorber conduit 16. As shown in FIG. 3, absorber 15, in addition to conduit 16, has two lateral fins 17 extending from a base portion or a side portion of the conduit. It is this base portion of the absorber which is positioned to intercept the incoming light rays reflected from reflector 11 so that the solar energy incident upon the absorber will often be received or collected directly by the conduit. To aid in the conduction of energy received upon the absorber, it is painted, coated (as with black chrome), or otherwise treated with a high radiant absorbing color, preferably black.

The location and width of the absorber base is very important in achieving a solar energy collector 10 which has a high energy absorbing efficiency when maintained in a fixed position through numerous days. Thus, according to the concepts and structure of the present invention, sunlight reflected by reflector 11 directly upon absorber 15 is efficiently converted to heat through a minuimum period of at least six hours per day with the time between a change of inclination of reflector 11 and absorber 15, as a whole, ranging from about 21 days to about 60 days, with a minimum total of only seven different positions required during a year due to solar declination. The exact location of the reflector, based upon a grid of "x" and "y" coordinates, is with the apex of the half parabola reflector located at a point (0.0, 0.0) with the other end portion of the parabola being located at a point (8.3, 7.8). Absorber 15 is desirably located at a point y=0.1 to 4.0 with a preferred location ranging from y=0.25 to y=2.50. The focal point of the collector on the absorber is (0.0, 2.20). Such proportions, which can be either scaled up or down to suit a particular application, result in the absorber having an effective angle of acceptance of sunlight reflected from the reflector of about 11 or 12 degrees and a reflector capture area to absorber area ratio of about 3.67. When incorporated into a solar collector panel, the absorber-reflector combination naturally can be positioned at any angle such as that dictated by convenience, design, and the like. Specifically, the angle in FIGS. 1, 2, 3, and 8 is 64° with respect to the strut member 30. However, it can range from about 45° to about 100° with a range of from about 64° to about 90° being preferred.

Such a design, as noted, yields a surprisingly efficient solar energy collector based upon the time of energy collection incident upon the absorber during a day as well as for a period of days without any movement, whatsoever, of solar energy collector 10 as a whole. Moreover, the width of lateral fins 17 along with conduit 16 in effecting an accceptance angle of 12 degrees is not overly great such that the fins act as a conductor of heat away from conduit 16.

Absorber 15, as shown in FIG. 2, is isolated or separated from the reflector from which it receives reflected sunlight and is nestled under or located beneath an adjacent reflector by a mounting block 20 which is attached to struts 30. By the phrase "located under," it is meant that a substantial portion of absorber 15, and preferably all of it, is located under or beneath the outward reflector edge 14 as shown in FIG. 2. The existence of the gap prevents the reflector from acting as a cooling fin.

Mounting blocks, generally indicated by the numeral 20, secure and attach reflector 11 as well as absorber 15 to each other and/or to supporting or mounting struts 30, as well as insulate them therefrom. Any number of mounting blocks can be utilized with three being desirable per individual solar energy collector for each strut as shown in FIG. 2. Any type of a good insulating material may be utilized for the mounting blocks with a resilient material such as an elastomer being preferred in order to provide quick assembly of collector 10. A specific and preferred elastomer, EPDM, a terpolymer made from ethylene-propylene diene monomers, has been found to offer the combination of good insulation properties as well as physical properties to secure the absorber or the reflector to each other and/or to struts 30. Also, various silicone base materials may be utilized. Any method of securement or connection between these parts may be utilized such as screws, rivets, various fasteners, and the like. However, a suitable method of attachment merely involves the existence of a cavity or recess such as mushroom-type. apertures 22 at appropriate desired locations in the various mounting blocks which engage a projection 24 having a head 25 such as in the form of a pair of flanges, a "T" or an arrowhead. Of course, other equivalent mating engagements may be utilized wherein recess or cavity lip portions 23 of the elastomer or rubber can be biasly opened by projection 24 and resiliently snapped back into place once projection head 25 has been inserted past said lips. As best shown in FIGS. 2 and 5, projections 24 may be extruded as an integral part with reflector 11 and absorber 15.

As shown in FIGS. 2, 6 and 7, the apex and mid-section reflector mounting blocks 20A and 20B, respectively, have a base portion 26 which desirably conforms to the portion of the strut which it contacts. The base portion may be secured to the strut with any conventional fastening means such as a rivet, a bolt, or a screw which extends through the strut. The top surface 27 of the mounting blocks preferably conforms with the back surface of the reflector 11 as shown in the drawings. Thus, through such an engagement, the reflector may be readily and securely mounted to strut 30 and yet insulated therefrom.

Considering mounting block 20C located at the outward end portion of the reflector, its primary purpose is to provide an insulated securement of absorber 15 to reflector 11 such that a gap exists between them. The exact connection of the mounting block to the reflector may utilize any standard fastening means such as the arrowhead projection 24 of the reflector which matingly engages a cavity-type aperture 22 of the mounting block as shown in FIG. 5. Similarly, a pair of projection flanges 24 on conduit 16 matingly engages aperture recess 22 located within the mounting block. In order to reduce the amount of heat transferred to the mounting block and primarily to permit insertion of the absorber conduit into the mounting block recess 22, the conduit recess has ribs 28 extending therefrom to provide an insulating air space therebetween. The pertinent factor with regard to this mounting block is that the absorber is attached to, and yet held a fixed insulated distance away from, the reflector. Otherwise, contact between the absorber and the reflector would result in the adjacent reflector being utilized as a cooling fin. Although not necessary, but as shown in FIG. 5, the absorber securing mounting block may be connected to strut 30 to provide additional support and to further stabilize absorber 15. Once again, any number of conventional methods may be utilized such as merely an integral extension of the elastomeric mount to engage the strut (not shown) or a strut support leg 33 extending upwardly and matingly engaging a portion of the mounting block as shown in FIG. 4.

Struts 30 may be made of any conventional metal, with aluminum being preferred since it can be easily extruded and, thus, involves a low shaping expense. Struts 30 may be in the form of a channel having side flanges with the base portion of the elastomeric or rubber mounting blocks 30 positioned therein. Generally, three struts are utilized, one at each end of every pair of reflector and absorber units. Any number of banks or rows of the reflector-absorber pairs may be utilized for a strut, thereby forming solar collector panel 1. Desirably, the panels are enclosed to prevent dirt, debris, dust, and corrosive elements in the air from residing upon or attaching to the various structural elements of the collector panel, especially the reflector and absorber. The back and sides of the panel can be enclosed by any weather and corrosive-resistant material such as painted wood, plastic, fiberglass or galvanized metal. The front of the panel is enclosed by a highly transparent material such as glass or preferably a plastic such as an acrylic sheet. Of course, various solar energy collector panels can be connected with various other panels to create a heating conduit of any desired length, depending upon the particular application.

Solar collector panel 40 may be mounted on any suitable and, generally, unobstructed sunlight surface such as on the roof of a building. For example, a pair of rails 42 may be mounted on the building running in a north-south direction. Collector panel 40 may be mounted in any conventional manner such as through base pins 34 which reside within pillow blocks mounted to the rails. The top of the collector panel may be attached to a metal brace 50 having a plurality of holes or apertures 51 therein in any conventional manner. For example, as shown in FIG. 8, release pins 36 can extend through the top of panel struts 30 and engage a particular brace aperture 51. A hose or pipe is then attached to the inlet and outlet conduit portions of the panel which are connected to a suitable heat exchanger system. As shown in FIG. 8, a suitable embodiment only involves the existence of seven brace apertures 51 to allow the inclination of collector panel 40 to be raised or lowered throughout the year depending upon the inclination of the sun. This requirement of only occasional release pin adjustment is attributed to the above-described design of a solar energy collector containing an absorber having a 12 degree effective angle of acceptance. Through such a design, collector panel 40 can provide a minimum of six hours per day of efficient and high output heating through periods ranging from about 21 to about 60 days. All that is required when, for example, the sun rises higher in the sky during the summer is that release pins 36 be removed from the top of collector panel 40, the collector panel lowered one notch, and the release pins be inserted into the adjacent lower aperture. Of course, the reverse operation is repeated in the fall. For example, the tracking realignment data and dates for 41' North Latitude are as follows:

| Sun's Angle in Degrees on N-S Plane at Realignment | Collector Panel Slope (Strut) Angle in Degrees | Dates From–To |
| --- | --- | --- |
| 21.6 | 94.4 | 11/3–2/5 |
| 27.8 | 88.2 | 2/5–2/23 |
|  |  | 10/16–11/3 |
| 36.7 | 79.3 | 2/23–3/16 |
|  |  | 9/25–10/16 |
| 48.3 | 67.7 | 3/16–4/7 |
|  |  | 9/3–9/25 |
| 57.1 | 58.9 | 4/7–4/27 |
|  |  | 8/14–9.3 |
| 64.4 | 51.6 | 4/27–5/17 |
|  |  | 7/25–8/14 |
| 69.9 | 46.1 | 5/17–7/25 |

For any other latitude location of the solar energy collector panel, the tracking realignment dates will be the same but the strut angle will be different from each latitude location with respect to each tracking. Such slope or strut angle can be readily determined from the above information and data by one skilled in the art.

Once the solar energy collector panel has been set up at a proper angle of incident with regard to sunlight for a particular time of the year, it can be used for a myraid number of applications, for example, heating a plating bath. Moreover, the system can be connected to a heat pump which then supplies heat to any desired application. The particular fluid utilized for absorbing the heat from absorber 15 is an oil-base fluid. Such a fluid has significant advantages in that it does not require any antifreeze and, thus, is free from toxic components, has a high boiling temperature and, does not create any vapor or steam pressure; and, does not corrode the aluminum.

While in accordance with the patent statutes, only the preferred embodiments of the invention have been illustrated and described in detail, it is to be understood that the invention is not limited thereto; the invention being defined by the scope of the appended claims.

What is claimed is:

1. A fixed position solar energy collector for reflecting and concentrating radiant energy, comprising:
   a plurality of reflectors, each said reflector having a reflecting surface for collecting, concentrating, and reflecting solar radiant energy and a non-concentrating surface;
   each said reflecting surface facing in a southwardly direction;
   a plurality of absorbers, each said absorber on one side thereof collecting said concentrated and reflected radiant energy from an adjacently positioned one of said reflectors, each said absorber having a conduit;

each said absorber spaced from said adjacent reflector;

a support strut for supporting said plurality of absorbers and reflectors;

a plurality of insulating mounting blocks, each said mounting block located on the non-concentrating side of said absorber and said reflector to said strut and insulating said absorber therefrom and securing said absorber;

mounting means for securing said absorbers and reflectors to said mounting blocks and said mounting blocks to said strut;

each said absorber having a 12 degree acceptance angle for receiving radiant energy reflected from said reflector;

said reflector having an end portion located at X=0.0 and Y=0.0 on an X-Y axis grid;

the remaining end portion of said reflector located at the point of about X=8.3 and about Y=7.8 on said X-Y axis grid, and said absorber extending from about 0.25 to about 2.5 on said Y-axis; and the energy collector having a means for positioning said strut at a discrete number of fixed angular positions to called radiant energy throughout a year.

2. A solar energy collector according to claim 1, wherein said absorber mounting block also engages said adjacent reflector and is located beneath said adjacent reflector.

3. A solar energy collector according to claim 2, wherein said reflector surface is a half parabola.

4. A solar energy collector according to claim 1, wherein said mounting block secures said absorber.

5. A solar energy collector according to claim 4, wherein said absorber has a 12 degree acceptance angle for receiving radiant energy reflected from said reflector, wherein said reflector reflecting surface is a half parabola, wherein said remaining end portion of said reflector is located at the point of about X=8.3 and about Y=7.8 on an X-Y axis grid, and wherein said absorber extends from about 0.25 to about 2.5 on said Y-axis.

6. A solar energy collector according to claim 5, wherein said absorber insulating block engages an adjacent reflector, said absorber insulating block insulating said absorber from said reflector, and wherein said absorber is located beneath an adjacent reflector.

7. A solar energy collector according to claim 6, wherein said absorber has a 12 degree acceptance angle for receiving radiant energy reflected from said reflector, wherein said reflector reflecting surface is a half parabola, wherein said remaining end portion of said reflector is located at the point of about X=8.3 and about Y=7.8 on an X-Y axis grid, and wherein said absorber extends from about 0.25 to about 2.5 on said Y-axis.

8. A solar energy collector according to claim 1, including a brace, a plurality of apertures in said brace;
    said strut having an upper end portion, a release pin located in said upper end portion of said strut; and
    said release pin engaging one of said plurality of brace apertures so that said solar energy collector is maintained in a fixed position.

9. A solar energy collector according to claim 8, wherein said solar collector brace has a plurality of discreet realignment positions, said release pin is maintained in one of said brace apertures for a period of days.

10. A solar enrgy collector according to claim 9, wherein the number of realignment positions is seven.

11. A solar energy collector according to claim 9, including a plurality of said reflectors, a plurality of said absorbers, a plurality of reflector mounting blocks, a plurality of insulating blocks, said absorber insulating block engaging an adjacent reflector, said absorber insulating block insulating said absorber from said reflector, and wherein said absorber is located beneath an adjacent reflector.

12. A solar energy collector according to claim 11, wherein said absorber has a 12 degree acceptance angle for receiving radiant energy reflected from said reflector, wherein said reflector reflecting surface is a half parabola, and wherein said remaining end portion of said reflector is located at the point of about X=8.3 and about Y=7.8 on an X-Y axis grid.

13. A solar energy collector according to claim 11, wherein the number of realignment positions is 7.

14. A solar energy collector according to claim 12, wherein said absorber extends from about 0.25 to about 2.5 on said Y-axis and wherein said insulating block secures said absorber.

15. A solar energy collector according to claim 12, wherein the number of realignment positions is 7.

16. A solar energy collector according to claim 14, wherein the number of realignment positions is 7.

* * * * *